(12) United States Patent
Jin (10) Patent No.: US 11,016,339 B2
(45) Date of Patent: May 25, 2021

(54) BACKLIGHT MODULE AND IN VEHICLE DISPLAY DEVICE

(71) Applicant: WUHAN CHINA STAR OPTOELECTRONICS TECHNOLOGY CO., LTD., Wuhan (CN)

(72) Inventor: Fubao Jin, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/753,777

(22) PCT Filed: Dec. 20, 2019

(86) PCT No.: PCT/CN2019/126833
§ 371 (c)(1),
(2) Date: Apr. 5, 2020

(87) PCT Pub. No.: WO2021/036116
PCT Pub. Date: Mar. 4, 2021

(65) Prior Publication Data
US 2021/0063817 A1 Mar. 4, 2021

(30) Foreign Application Priority Data
Aug. 28, 2019 (CN) .......................... 201910801349.8

(51) Int. Cl.
*G02F 1/13357* (2006.01)
*G02F 1/1335* (2006.01)

(52) U.S. Cl.
CPC .. *G02F 1/133603* (2013.01); *G02F 1/133606* (2013.01); *G02F 1/133608* (2013.01); *G02F 1/133612* (2021.01)

(58) Field of Classification Search
CPC ......... G02F 1/133603; G02F 1/133608; G02F 1/133609; G02F 1/133612; G02F 1/133606; G02F 1/133611; G02F 2001/133607
See application file for complete search history.

(56) References Cited

U.S. PATENT DOCUMENTS

2002/0044437 A1* 4/2002 Lee .................... G02F 1/133604
362/633
2006/0264093 A1* 11/2006 Shim ................... G02F 1/13452
439/495

(Continued)

FOREIGN PATENT DOCUMENTS

CN 201788335 U 4/2011
CN 201902933 U 7/2011

(Continued)

*Primary Examiner* — Jong-Suk (James) Lee
*Assistant Examiner* — James M Endo
(74) *Attorney, Agent, or Firm* — JMB Davis Ben-David (57) ABSTRACT

The present disclosure provides a backlight module and an in-vehicle display device. The backlight module includes a back plate, a light board, a diffusion plate, and a bracket layer. The bracket layer is arranged between the light board and the diffusion plate. The bracket layer is used to support the diffusion plate and spaces the light board apart from the diffusion plate to form a light mixture space. By adjusting a height of the bracket layer, it is convenient to adjust a distance of the light mixture space formed between the diffusion plate and the light board. Accordingly, backlight display performance of the backlight module and the in-vehicle display device is improved.

12 Claims, 4 Drawing Sheets

(56) References Cited

U.S. PATENT DOCUMENTS

| | | | | |
|---|---|---|---|---|
| 2009/0121652 A1* | 5/2009 | Kang | ............... | G02F 1/133603 |
| | | | | 315/297 |
| 2009/0174838 A1* | 7/2009 | Park | ............... | G02F 1/133608 |
| | | | | 349/64 |
| 2009/0207125 A1* | 8/2009 | Park | ............... | G02F 1/133608 |
| | | | | 345/102 |
| 2009/0268121 A1* | 10/2009 | Hisada | ............. | G02F 1/133608 |
| | | | | 349/58 |
| 2009/0302780 A1* | 12/2009 | Kim | ..................... | H05B 45/00 |
| | | | | 315/294 |
| 2010/0039579 A1* | 2/2010 | Park | ............... | G02F 1/133603 |
| | | | | 349/58 |
| 2010/0073914 A1* | 3/2010 | Park | ............... | G02F 1/133608 |
| | | | | 362/97.2 |
| 2010/0118023 A1* | 5/2010 | Jung | ................... | G06F 1/1601 |
| | | | | 345/214 |
| 2010/0172124 A1* | 7/2010 | Cho | ..................... | H01L 33/642 |
| | | | | 362/97.1 |
| 2010/0208452 A1* | 8/2010 | Park | ............... | G02F 1/133608 |
| | | | | 362/97.1 |
| 2010/0245708 A1* | 9/2010 | Baba | ............... | G02F 1/133603 |
| | | | | 349/58 |
| 2011/0068709 A1* | 3/2011 | Ing | ....................... | H05K 1/142 |
| | | | | 315/294 |
| 2012/0092588 A1 | 4/2012 | Yoshikawa | | |
| 2013/0063669 A1* | 3/2013 | Mouri | ............. | G02F 1/133603 |
| | | | | 348/739 |
| 2018/0119932 A1* | 5/2018 | Yeh | ................... | G02F 1/133608 |

FOREIGN PATENT DOCUMENTS

| | | |
|---|---|---|
| CN | 102472913 A | 5/2012 |
| JP | 2014207067 A | 10/2014 |

\* cited by examiner

BACKLIGHT MODULE AND IN VEHICLE DISPLAY DEVICE

CROSS-REFERENCE TO RELATED APPLICATIONS

This is the U.S. National Stage of International Patent Application No. PCT/CN2019/126833 filed Dec. 20, 2019, which in turn claims the benefit of Chinese Patent Application No. 201910801349.8 filed Aug. 28, 2019.

FIELD OF DISCLOSURE

The present invention relates to a field of display technology and in particular, to a backlight module and an in-vehicle display device.

DESCRIPTION OF RELATED ART

With the development of vehicles and transportation, more and more information needs to be acquired during vehicle rides, and the driver's need for information interaction has also increased. As a kind of vehicle information carriers, an in-vehicle display can be used to display videos, images, and the like to intuitively and effectively disseminate information and realize many information interactions.

At present, a backlight source of an in-vehicle liquid crystal display (LCD) device is spaced apart from a diffusion plate by a sealant frame to form a light mixture gap of a certain distance. However, the sealant frame is made of a harder material, so it is not convenient to adjust a ratio of a distance between the backlight source and the diffusion plate to a thickness of the diffusion plate. Therefore, it is easy to cause a problem of "starry" light and shadows, and hence the display quality of the display device is compromised. Moreover, the sealant frame is produced at higher production costs, and its manufacturing process is complicated, which is not conducive to production.

In summary, the conventional in-vehicle display device has a problem that the light mixture distance is difficult to adjust, and the display performance is not good. Therefore, it is necessary to provide a backlight module and an in-vehicle display device to solve this problem.

SUMMARY

The present application provides a backlight module and an in-vehicle display device for solving the problem that a mixed light distance of an existing in-vehicle display device is not easy to adjust, and therefore the display performance is not good.

Accordingly, the present application provides a backlight module, comprising:
a back plate;
a light board disposed on the back plate;
a diffusion plate disposed at one side of the light board away from the back plate; and
a bracket layer disposed between the light board and the diffusion plate, wherein the bracket layer is configured to support the diffusion plate and space the light board apart from the diffusion plate to form a light mixture space.

According to one embodiment of the present application, the light board comprises a circuit board and a plurality of micro light-emitting diodes arranged in an array on the circuit board, and the bracket layer is disposed on an edge of the circuit board.

According to one embodiment of the present application, a groove is defined in one side of the bracket layer adjacent to the light board, and an accommodating space is formed between the groove and the light board.

According to one embodiment of the present application, the circuit board is provided with a gold finger end in the accommodating space, circuits of the circuit board are all connected to the gold finger end, the backlight module further comprises a flexible circuit board, and the flexible circuit board is extended into the accommodating space through an opening of the back plate and is bound to the gold finger end.

According to one embodiment of the present application, the circuit board is provided with a connector in the accommodating space, circuits of the light board are all connected to the connector, the backlight module further comprises a flexible circuit board, and the flexible circuit board is extended into the accommodating space through an opening of the back plate and is inserted into the connector.

According to one embodiment of the present application, the backlight module further comprises a sealant frame bent from an outside of the back plate to an inside of the back plate and configured to support a display panel.

According to one embodiment of the present application, the backlight module further comprises a first prism sheet and a second prism sheet stacked on the diffusion plate, and a gap is formed between the second prism sheet and the sealant frame bent to the inside of the back plate.

According to one embodiment of the present application, a thickness of the gap ranges from 0.2 mm to 0.3 mm.

According to one embodiment of the present application, a material of the bracket layer comprises rubber.

The present application further provides an in-vehicle display device, comprising a backlight module, the backlight module comprising:
a back plate;
a light board disposed on the back plate;
a diffusion plate disposed at one side of the light board away from the back plate; and
a bracket layer disposed between the light board and the diffusion plate, wherein the bracket layer is configured to support the diffusion plate and space the light board apart from the diffusion plate to form a light mixture space.

According to one embodiment of the present application, the light board comprises a circuit board and a plurality of micro light-emitting diodes arranged in an array on the circuit board, and the bracket layer is disposed on an edge of the circuit board.

According to one embodiment of the present application, a groove is defined in one side of the bracket layer adjacent to the light board, and an accommodating space is formed between the groove and the light board.

According to one embodiment of the present application, the circuit board is provided with a gold finger end in the accommodating space, circuits of the circuit board are all connected to the gold finger end, the backlight module further comprises a flexible circuit board, and the flexible circuit board is extended into the accommodating space through an opening of the back plate and is bound to the gold finger end.

According to one embodiment of the present application, the circuit board is provided with a connector in the accommodating space, circuits of the light board are all connected to the connector, the backlight module further comprises a flexible circuit board, and the flexible circuit board is extended into the accommodating space through an opening of the back plate and is inserted into the connector.

According to one embodiment of the present application, the backlight module further comprises a sealant frame bent from an outside of the back plate to an inside of the back plate and configured to support a display panel.

According to one embodiment of the present application, the backlight module further comprises a first prism sheet and a second prism sheet stacked on the diffusion plate, and a gap is formed between the second prism sheet and the sealant frame bent to the inside of the back plate.

According to one embodiment of the present application, a thickness of the gap ranges from 0.2 mm to 0.3 mm.

According to one embodiment of the present application, a material of the bracket layer comprises rubber.

The present application further provides an in-vehicle display device comprising a backlight module, the backlight module comprising:
  a back plate;
  a light board disposed on the back plate;
  a diffusion plate disposed at one side of the light board away from the back plate; and
  a bracket layer disposed between the light board and the diffusion plate, wherein the bracket layer is configured to support the diffusion plate and space the light board apart from the diffusion plate to form a light mixture space;
  wherein the light board comprises a circuit board and a plurality of micro light-emitting diodes arranged in an array on the circuit board, a groove is defined in one side of the bracket layer adjacent to the light board, and an accommodating space is formed between the groove and the light board.

According to one embodiment of the present application, the circuit board is provided with a gold finger end in the accommodating space, and circuits of the circuit board are all connected to the gold finger end. The backlight module further comprises a flexible circuit board, and the flexible circuit board is extended into the accommodating space through an opening of the back plate and is bound to the gold finger end.

Advantages of the Present Invention

In the present disclosure, the bracket layer is disposed between the diffusion plate and the light board of the backlight module. The bracket layer is configured to support the diffusion plate and space the light board apart from the diffusion plate to form the light mixture space. By adjusting a height of the bracket layer, it is convenient to adjust a distance of the light mixture space formed between the diffusion plate and the light board. Such configuration minimizes a problem of "starry" light and shadows, and improves backlight display performance of the backlight module and the in-vehicle display device.

BRIEF DESCRIPTION OF DRAWINGS

In order to more clearly illustrate the embodiments of the present disclosure or related art, figures which will be described in the embodiments are briefly introduced hereinafter. It is obvious that the figures are merely for the purposes of illustrating some embodiments of the present disclosure, and a person having ordinary skill in this field can obtain other figures according to these figures without an inventive work.

DETAILED DESCRIPTION OF EMBODIMENTS

The following description is provided to illustrate specific embodiments of the present invention. Directional terms, such as "upper", "lower", "front", "rear", "left", "right", "inside", "outside", and "lateral" in the present disclosure, are only illustrative with reference to the accompanying drawings. Therefore, the directional terms are only for the purpose of illustration and ease of understanding, and are not intended to be limiting. In the drawings, structurally similar elements are denoted by the same reference numerals.

The disclosure is further described below with the accompanying drawings and specific embodiments.

First Embodiment

Figure 1:
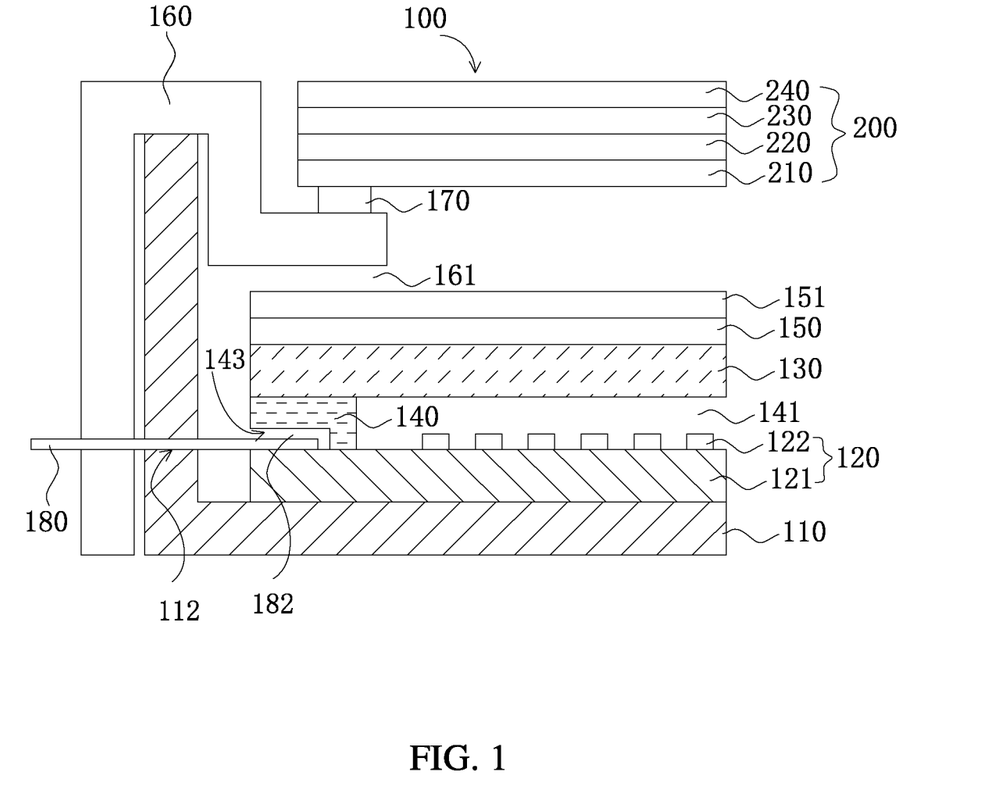
FIG. 1 is a cross-sectional structural view illustrating a backlight module according to a first embodiment of the present disclosure.

The present disclosure provides a backlight module which will be described in detail below in conjunction with FIGS. 1 to 2. FIG. 1 is a cross-sectional structural view illustrating a backlight module 100 according to one embodiment of the present disclosure. The backlight module 100 comprises a back plate 110, a light board 120, a diffusion plate 130, and a bracket layer 140. The light board 120 is attached to the back plate 110 by a thermal conductive adhesive tape. The diffusion plate 130 is disposed at one side of the light board 120 away from the back plate 110. The bracket layer 140 is disposed between the light board 120 and the diffusion plate 130, wherein the bracket layer 140 is configured to support the diffusion plate 130 and space the light board 120 apart from the diffusion plate 130 to form a light mixture space 141. A gap between adjacent two surfaces of the light board 120 and the diffusion plate 130 is the light mixture space 141. A light emitted from the light board 120 as a light source directly forms a plane light source in the light mixture space 141.

In the present embodiment, the light board 120 comprises a circuit board 121 and a plurality of micro light-emitting diode 122. As shown in FIG. 2, it is a schematic plan view illustrating the backlight module 100 according to the present embodiment. Only some micro light-emitting diodes 122 and a portion of the bracket layer 140 are shown in FIG. 2. The micro light-emitting diodes 122 are arranged in an array on the circuit board 121. The bracket layer 140 is disposed around edges of the circuit board 121 and surrounds the micro light-emitting diodes 122.

A material of the bracket layer 140 comprises rubber. Compared with a material of a sealant frame, the rubber is softer. Therefore, a thickness of the bracket layer 140 made of rubber can be adjusted by pressing or other methods, and a distance of the light mixture space 141 can be directly adjusted along a thickness direction of the backlight module 100. In the structure of the backlight module 100 of the present embodiment, the thickness of the bracket layer 140 is the distance of the light mixture space 141. By adjusting the distance of the light mixture space 141 to a suitable ratio with respect to the diffusion plate 130, the light emitted by the micro light-emitting diodes 122 to the display panel 200 is more uniform, thereby effectively minimizing a problem of "starry" light and shadows, and improving display quality of the backlight module 100 and the display panel 200. In addition, rubber is produced at lower production costs than the sealant frame, and a process of producing rubber is simpler than a process of producing the sealant frame. Therefore, by using the bracket layer 140 made of rubber instead of using a conventional sealant frame, the manufacturing processes can be simplified and the production costs can be reduced.

In the present embodiment, as shown in FIG. 1, a groove is defined in one side of the bracket layer 140 adjacent to the light board 120, and an accommodating space 143 is formed between the groove and the light board 120. The circuit board 121 is provided with a gold finger end 182 in the accommodating space 143, and circuits of the circuit board 121 are all connected to the gold finger end 182. The backlight module 100 further comprises a flexible circuit board 180, and the flexible circuit board 180 extends into the accommodating space 143 through an opening 112 of the back plate 110 and is bound to the gold finger end 182. A position where the flexible circuit board 180 is bound to the gold finger end 182 is arranged in the accommodating space 143 defined by the bracket layer 140 and the circuit board 120, so a space originally occupied by the gold finger end 182 can be saved, thereby reducing a width of the bracket layer 140 in a planar structure. Thus, a width of a lower bezel of the backlight module 100 can be reduced, and a screen ratio of an in-vehicle display device can be effectively increased.

Figure 2:
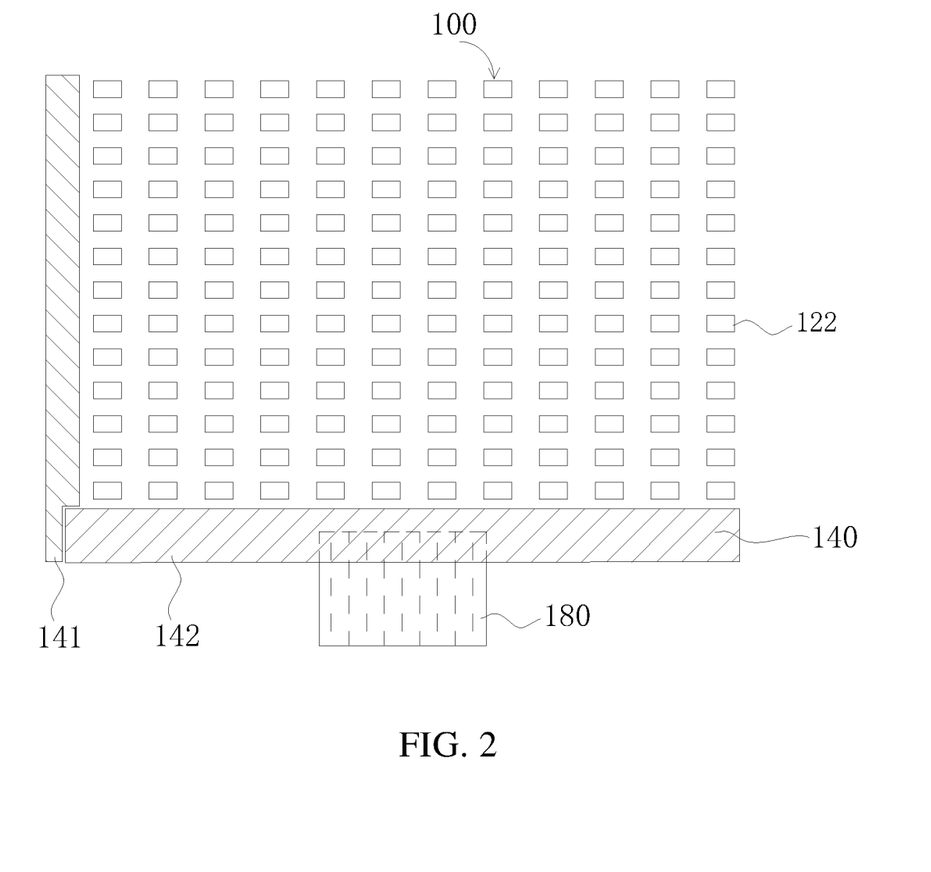
FIG. 2 is a schematic plan view illustrating the backlight module according to the first embodiment of the present disclosure.

Referring to FIG. 2, the bracket layer 140 includes multiple connected portions which are respectively arranged corresponding to four outer edges of the circuit board 121. FIG. 2 only shows a first portion 141 and a second portion 142 connected to each other. The first portion 141 and the second portion 142 both have a long strip shape. An L-shaped recess is arranged where the first portion 141 is connected to the second portion 142. One end of the second portion 142 is connected to the L-shaped recess to effectively improve the stability of the bracket layer 140 and to ensure reliability in reliability tests. Certainly, other portions of the bracket layer 140 can be connected in the same manner that the first portion 141 and the second portion 142 are connected. In alternative embodiments, the multiple portions of the bracket layer 140 can also be connected in other ways for mating connection. Of course, the bracket layer 140 can also be designed as a whole according to actual needs.

In some embodiments, depending on the complexity and divisions of the circuits on the circuit board 121 of the light board 120, the circuit board 121 can be provided with multiple gold finger ends. If less regions are partitioned on the circuit board 121, all the gold finger ends can be arranged on one side edge of the circuit board 121. If a circuit layout is more complicated, and more regions are partitioned on the circuit board 121, the gold finger ends can be arranged on two opposed sides, i.e. upper and lower edges, or left and right edges of the circuit board 121. At this time, the bracket layer 140 on the two opposed sides needs to form corresponding grooves for space-saving in regard to the gold finger end and the flexible circuit board.

In the present embodiment, as shown in FIG. 1, the backlight module 100 further comprises a sealant frame 160. The sealant frame 160 is bent from an outside of the back plate 110 to an inside of the back plate 110 and configured to support a display panel 200. A foam tape 170 is disposed between the sealant frame 160 and the display panel 200 for protecting the display panel 200. The display panel 200 further comprises a first polarization sheet 210, an array substrate 220, a color filter substrate 230, and a second polarization sheet 240.

In the present embodiment, the backlight module 100 further comprises a first prism sheet 150 and the second prism sheet 151 stacked on the diffusion plate 130, and the first prism sheet 150 and the second prism sheet 151 are of a same size. A gap 161 is formed between the second prism sheet 151 and the sealant frame 160 bent to the inside of the back plate 110. The gap 161 is configured to reserve a certain space for expansion of the above-mentioned prism sheets in reliability tests to prevent poor display quality caused by warping of the prism sheets.

Preferably, a thickness of the gap 161 ranges from 0.2 mm to 0.3 mm.

In the present embodiment, the bracket layer 140 is disposed between the diffusion plate 130 and the light board 120 of the backlight module 100. The bracket layer 140 is configured to support the diffusion plate 130 and space the light board 120 apart from the diffusion plate 130 to form the light mixture space 141. By adjusting a height of the bracket layer 140, it is convenient to adjust the distance of the light mixture space 141 formed between the diffusion plate 130 and the light board 120. Thereby, the present invention minimizes a problem of "starry" light and shadows, and improves the backlight display performance of the backlight module 100.

Second Embodiment

Figure 3:
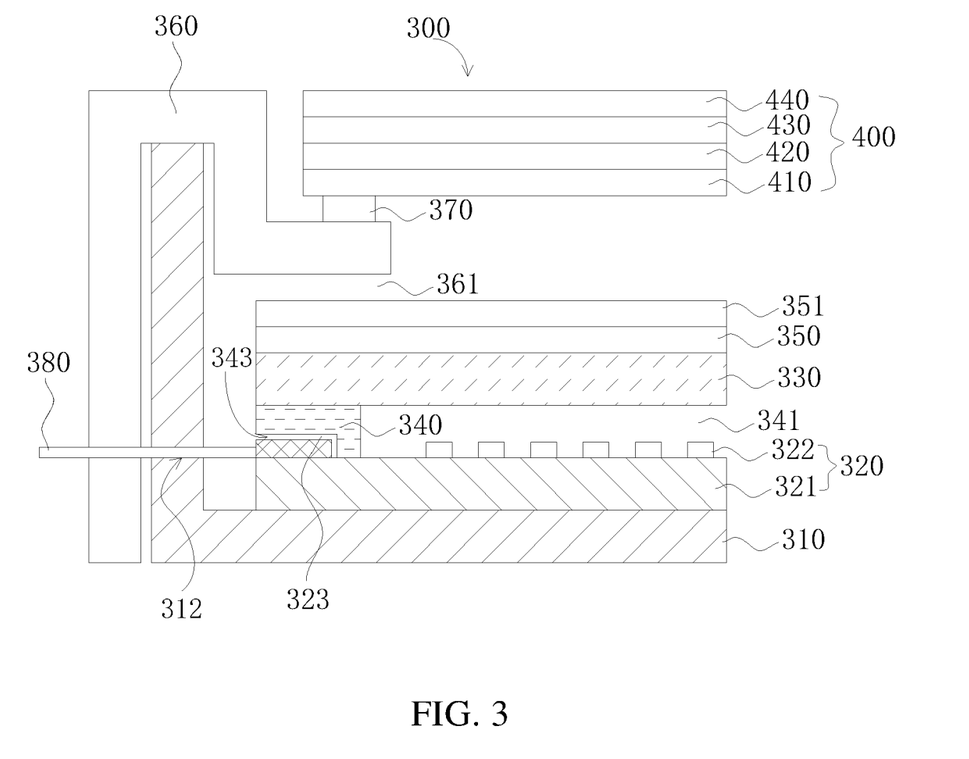
FIG. 3 is a cross-sectional structural view illustrating the backlight module according to a second embodiment of the present disclosure.

The present disclosure provides a backlight module which will be described in detail below in conjunction with FIGS. 3 and 4. Referring to FIG. 3, it is a cross-sectional structural view illustrating a backlight module 300 according to one embodiment of the present disclosure. The backlight module 300 comprises a back plate 310, a light board 320, a diffusion plate 330, and a bracket layer 340. The light board 320 is attached to the back plate 310 by a thermal conductive adhesive tape. The diffusion plate 330 is disposed at one side of the light board 320 away from the back plate 310. The bracket layer 340 is disposed between the light board 320 and the diffusion plate 330, wherein the bracket layer 340 is configured to support the diffusion plate 330 and space the light board 320 apart from the diffusion plate 330 to form a light mixture space 341. A gap between adjacent two surfaces of the light board 320 and the diffusion plate 330 is the light mixture space 341. A light emitted from the light board 320 as a light source directly forms a plane light source in the light mixture space 341.

In the present embodiment, the light board 320 comprises a circuit board 321 and a plurality of micro light-emitting diode 322. As shown in FIG. 4, it is a schematic plan view illustrating the backlight module 200 according to the present embodiment. Only some micro light-emitting diodes 322 and a portion of the bracket layer 340 are shown in FIG. 4. The micro light-emitting diodes 322 are arranged in an array on the circuit board 321. The bracket layer 340 is disposed around edges of the circuit board 321 and surrounds the micro light-emitting diodes 322.

In the present embodiment, a material of the bracket layer 340 comprises rubber. Compared with a material of a sealant frame, the rubber is softer. Therefore, a thickness of the bracket layer 340 made of rubber can be adjusted by pressing or other methods, and a distance of the light mixture space 341 can be directly adjusted along a thickness direction of the backlight module 300. In the structure of the backlight module 300 of the present embodiment, the thickness of the bracket layer 340 is the distance of the light mixture space 341. By adjusting the distance of the light mixture space 341 to a suitable ratio with respect to the diffusion plate 330, the light emitted by the micro light-emitting diodes 322 to the display panel 300 is more uniform, thereby effectively minimizing a problem of "starry" light and shadows, and improving display quality of the backlight module 300 and the display panel 400. In addition, rubber is produced at lower costs than the sealant frame, and a process of producing rubber is simpler than a process of producing the sealant frame. Therefore, by using the bracket layer 140 made of rubber instead of using a conventional sealant frame, the manufacturing processes can be simplified and the production costs can be reduced.

In the present embodiment, as shown in FIG. 3, a groove is defined in one side of the bracket layer 340 adjacent to the light board 320, and an accommodating space 343 is formed between the groove and the light board 320. The circuit board 321 is provided with a connector 323 in the accommodating space 343, and circuits of the light board 320 are all connected to the connector 323. The backlight module 300 further comprises a flexible circuit board 380, and the flexible circuit board 380 extends into the accommodating space 343 through an opening 312 of the back plate 310 and is inserted into the connector 323. By arranging the connector 323 in the accommodating space 343, a space originally occupied by the connector can be saved, thereby reducing a width of the bracket layer 340 in a planar structure. Thus, a width of a lower bezel of the backlight module 300 can be reduced, and a screen ratio of an in-vehicle display device can be effectively increased.

In some embodiments, depending on the complexity and divisions of the circuits on the circuit board 321 of the light board 320, the circuit board 321 can be provided with multiple connectors. If less regions are partitioned on the circuit board 321, all the connectors 323 can be arranged on one side edge of the circuit board 321. If a circuit layout is more complicated, and more regions are partitioned on the circuit board 321, the connectors 323 can be arranged on two opposed sides, i.e. upper and lower edges, or left and right edges of the circuit board 321. At this time, the bracket layer 340 on the two opposed sides needs to form corresponding grooves for space-saving in regard to the connectors 323 and the flexible circuit board 380.

Preferably, a thickness of the connector 323 should be less than a sum of thicknesses of the light mixture space 341 and the micro light-emitting diode 322, and a distance between an edge of the connector 323 and an edge of the accommodating space should be greater than or equal to 0.5 mm to facilitate assembly of the connector 323 and the bracket layer 340.

Figure 4:
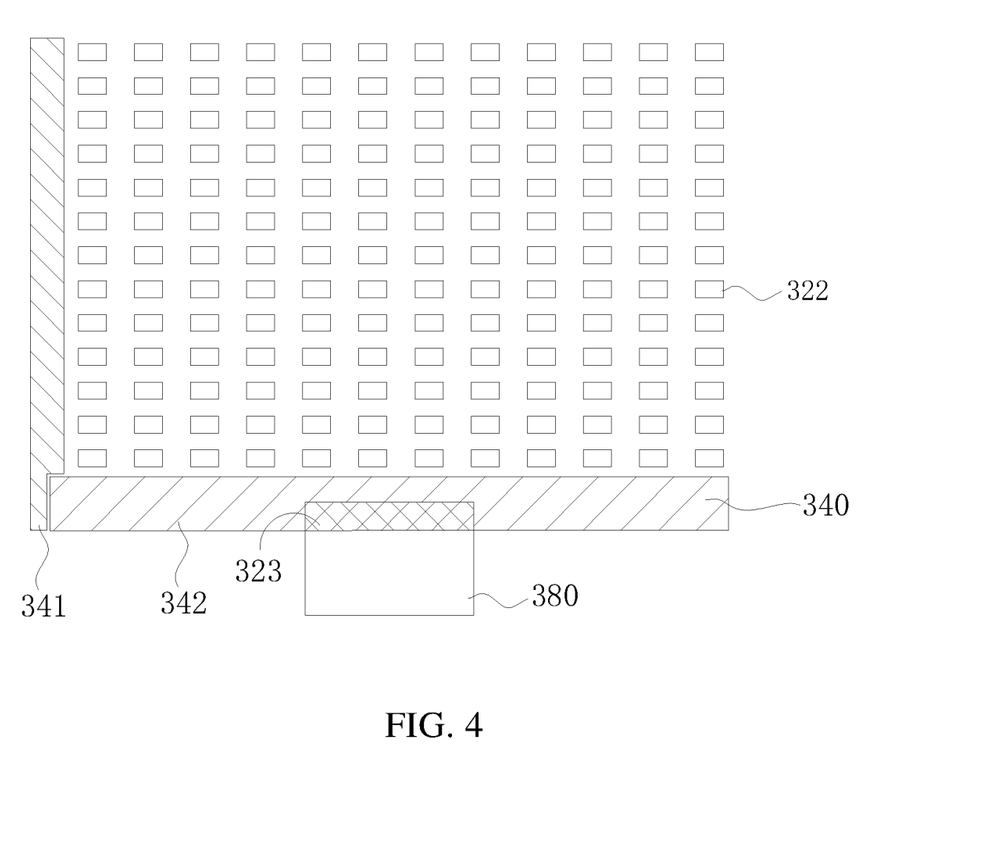
FIG. 4 is a schematic plan view illustrating the backlight module according to the second embodiment of the present disclosure.

Referring to FIG. 4, the bracket layer 340 includes multiple connected portions which are respectively arranged corresponding to four outer edges of the circuit board 321. FIG. 4 only shows a first portion 341 and a second portion 342 connected to each other. Where the first portion 341 is connected to the second portion 342 has an L-shaped recess. One end of the second portion 342 is connected to the L-shaped recess to effectively improve the stability of the bracket layer 340 and to ensure reliability in reliability tests. Certainly, other portions of the bracket layer 340 can be connected in the same or similar manner that the first portion 341 and the second portion 342 are connected. In alternative embodiments, the multiple portions of the bracket layer 340 can also be connected in other ways for mating connection. Of course, the bracket layer 340 can also be designed as a whole according to actual needs.

In the present embodiment, as shown in FIG. 3, the backlight module 300 further comprises a sealant frame 360. The sealant frame 360 is bent from an outside of the back plate 310 to an inside of the back plate 310 and configured to support a display panel 400. A foam tape 370 is disposed between the sealant frame 360 and the display panel 400 for protecting the display panel 400. The display panel 400 further comprises a first polarization sheet 410, an array substrate 420, a color filter substrate 430, and a second polarization sheet 440.

In the present embodiment, the backlight module 300 further comprises a first prism sheet 350 and the second prism sheet 351 stacked on the diffusion plate 330, and the first prism sheet 350 and the second prism sheet 351 are of a same size. A gap 361 is formed between the second prism sheet 351 and the sealant frame 360 bent to the inside of the back plate 310. The gap 361 is configured to reserve a certain space for expansion of the above-mentioned prism sheets in reliability tests to prevent poor display quality caused by warping of the prism sheets.

Preferably, a thickness of the gap 361 ranges from 0.2 mm to 0.3 mm.

In the present disclosure, the bracket layer 340 is disposed between the diffusion plate 330 and the light board 320 of the backlight module 300. The bracket layer 340 is configured to support the diffusion plate 330 and space the light board 320 apart from the diffusion plate 330 to form a light mixture space 341. By adjusting a height of the bracket layer 340, it is convenient to adjust a distance of the light mixture space 341 formed between the diffusion plate 330 and the light board 320. Such configuration minimizes a problem of "starry" light and shadows, and improves the backlight display performance of the backlight module 300.

The present disclosure further provides an in-vehicle display device which comprises the backlight module provided in the above embodiment, and can provide the same technical functions as the backlight module provided in the above embodiment, so a detailed description is not repeated here.

It is to be understood that the above descriptions are merely the preferable embodiment of the present disclosure and are not intended to limit the scope of the present disclosure. Equivalent changes and modifications made in the spirit of the present disclosure are regarded as falling within the scope of the present disclosure.

What is claimed is:

1. A backlight module, comprising:
   a back plate;
   a light board disposed on the back plate;
   a diffusion plate disposed at one side of the light board away from the back plate; and
   a bracket layer disposed between the light board and the diffusion plate, wherein the bracket layer is configured to support the diffusion plate and space the light board apart from the diffusion plate to form a light mixture space;
   a flexible circuit board;
   wherein a groove is defined in one side of the bracket layer adjacent to the light board, and an accommodating space is formed between the groove and the light board;
   wherein the light board comprises a circuit board, and a plurality of micro light-emitting diodes arranged in an array on the circuit board, the bracket layer is disposed at an edge of the circuit board and a material of the bracket layer comprises rubber, and the circuit board is provided with a gold finger end or a connector in the accommodating space; and wherein the flexible circuit board extends into the accommodating space through an opening of the back plate and is connected to the gold finger end or the connector.

2. The backlight module according to claim 1, wherein circuits of the circuit board are all connected to the gold finger end.

3. The backlight module according to claim 1, wherein circuits of the light board are all connected to the connector.

4. The backlight module according to claim 1, wherein the backlight module further comprises a sealant frame bent from an outside of the back plate to an inside of the back plate.

5. The backlight module according to claim 4, wherein the backlight module further comprises a first prism sheet and a second prism sheet stacked on the diffusion plate, and a gap is formed between the second prism sheet and the sealant frame bent to the inside of the back plate.

6. The backlight module according to claim 5, wherein a thickness of the gap ranges from 0.2 mm to 0.3 mm.

7. An in-vehicle display device, comprising a backlight module, the backlight module comprising:
 a back plate;
 a light board disposed on the back plate;
 a diffusion plate disposed at one side of the light board away from the back plate; and
 a bracket layer disposed between the light board and the diffusion plate, wherein the bracket layer is configured to support the diffusion plate and space the light board apart from the diffusion plate to form a light mixture space;
 a flexible circuit board;

wherein a groove is defined in one side of the bracket layer adjacent to the light board, and an accommodating space is formed between the groove and the light board;

wherein the light board comprises a circuit board and a plurality of micro light-emitting diodes arranged in an array on the circuit board, and the bracket layer is disposed at an edge of the circuit board and a material of the bracket layer comprises rubber, the circuit board is provided with a gold finger end or a connector in the accommodating space; and wherein the flexible circuit board extends into the accommodating space through an opening of the back plate and is connected to the gold finger end or the connector.

8. The in-vehicle display device according to claim 7, wherein circuits of the circuit board are all connected to the gold finger end.

9. The in-vehicle display device according to claim 7, wherein circuits of the light board are all connected to the connector.

10. The in-vehicle display device according to claim 7, wherein the backlight module further comprises a sealant frame bent from an outside of the back plate to an inside of the back plate.

11. The in-vehicle display device according to claim 10, wherein the backlight module further comprises a first prism sheet and a second prism sheet stacked on the diffusion plate, and a gap is formed between the second prism sheet and the sealant frame bent to the inside of the back plate.

12. The in-vehicle display device according to claim 11, wherein a thickness of the gap ranges from 0.2 mm to 0.3 mm.

* * * * *

UNITED STATES PATENT AND TRADEMARK OFFICE
CERTIFICATE OF CORRECTION

| | | |
|---|---|---|
| PATENT NO. | : 11,016,339 B2 | Page 1 of 1 |
| APPLICATION NO. | : 16/753777 | |
| DATED | : May 25, 2021 | |
| INVENTOR(S) | : Fubao Jin | |

It is certified that error appears in the above-identified patent and that said Letters Patent is hereby corrected as shown below:

On the Title Page

Item (54) and in the Specification, Column 1, Lines 1-2, should read:
"BACKLIGHT MODULE AND IN-VEHICLE DISPLAY DEVICE"

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*